(12) United States Patent
Bhargava et al.

(10) Patent No.: US 9,997,186 B1
(45) Date of Patent: Jun. 12, 2018

(54) DATA STORAGE DEVICE USING PERFORMANCE MARGIN TO BACK OFF FLY HEIGHT

(71) Applicant: Western Digital Technologies, Inc., Irvine, CA (US)

(72) Inventors: Puneet Bhargava, San Jose, CA (US); Remmelt Pit, Menlo Park, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days. days.

(21) Appl. No.: 15/889,419

(22) Filed: Feb. 6, 2018

(51) Int. Cl.
*G11B 5/60* (2006.01)

(52) U.S. Cl.
CPC .................. *G11B 5/6011* (2013.01)

(58) Field of Classification Search
CPC . G11B 5/012; G11B 5/02; G11B 5/60–5/6076
USPC .............................................. 360/55, 69, 75
See application file for complete search history.

(56) References Cited

U.S. PATENT DOCUMENTS

| 5,377,058 | A | 12/1994 | Good et al. |
| 7,212,361 | B1 * | 5/2007 | Pederson ............ G01R 31/3171 360/31 |
| 7,352,525 | B1 | 4/2008 | Shrestha et al. |
| 7,385,778 | B2 | 6/2008 | Kakiki |
| 7,502,205 | B1 * | 3/2009 | Hurtado ............... G11B 5/6005 360/75 |
| 7,602,571 | B2 | 10/2009 | Song et al. |
| 8,619,383 | B1 | 12/2013 | Jung et al. |
| 9,418,689 | B2 | 8/2016 | Lou et al. |
| 9,842,617 | B1 * | 12/2017 | Haralson ............... G11B 5/6011 |
| 2003/0156345 | A1 * | 8/2003 | Fayeulle ............... G11B 5/5521 360/75 |
| 2009/0262458 | A1 * | 10/2009 | Shen .................... G11B 5/6005 360/234.3 |
| 2010/0073795 | A1 | 3/2010 | Amano |
| 2013/0003221 | A1 * | 1/2013 | Kim ...................... G11B 5/6011 360/75 |
| 2017/0004853 | A1 * | 1/2017 | Canchi .................. G11B 5/455 |

* cited by examiner

*Primary Examiner* — Wayne Young
*Assistant Examiner* — James L Habermehl

(57) ABSTRACT

A data storage device is disclosed comprising a head actuated over a disk, wherein the head comprises a fly height actuator configured to control a fly height of the head over the disk. A plurality of host read commands are received from a host, and a performance metric associated with accessing the disk to execute the host read commands is measured. When the performance metric indicates the data storage device is operating with a performance margin, the fly height actuator is controlled to increase the fly height of the head over the disk, wherein the performance metric consists of at least one of a throughput of the host read commands and a power consumption of the data storage device.

20 Claims, 6 Drawing Sheets

AVERAGE COMMAND COMPLETION TIME

NUMBER OF HOST COMMANDS IN COMMAND QUEUE

DATA STORAGE DEVICE USING PERFORMANCE MARGIN TO BACK OFF FLY HEIGHT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
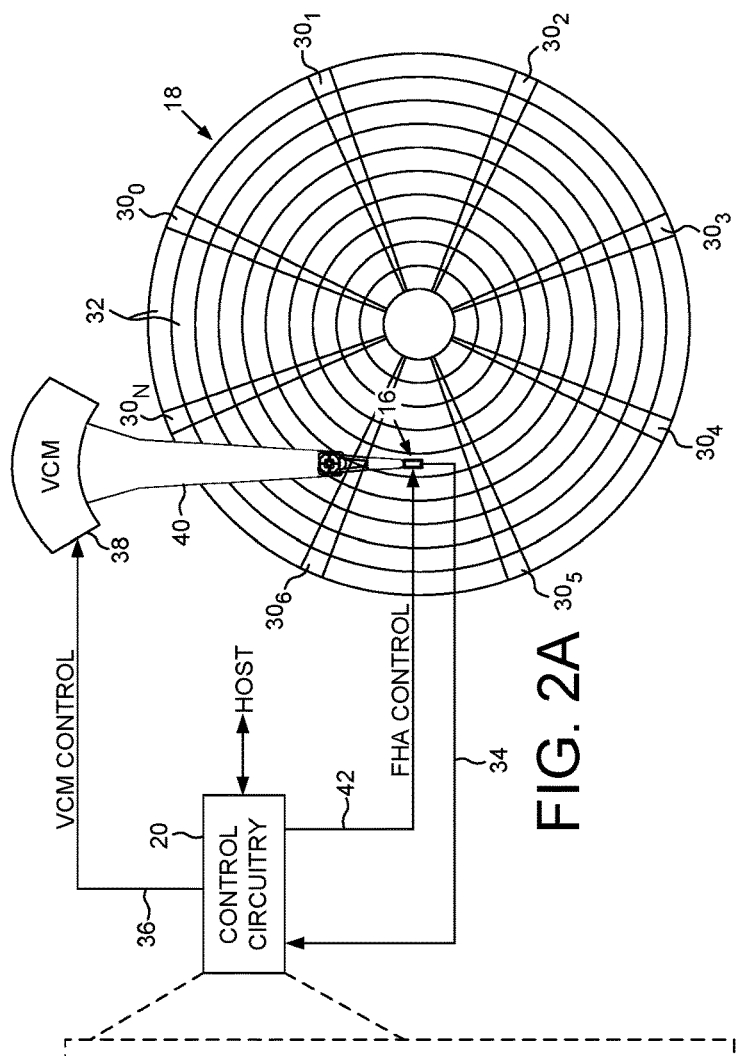
FIG. 2A shows a data storage device in the form of a disk drive according to an embodiment comprising a head actuated over the disk.
Figure 2B:
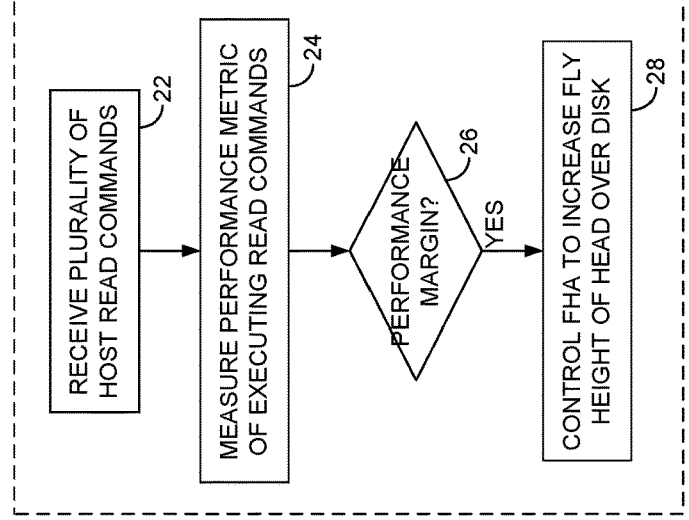
FIG. 2B is a flow diagram according to an embodiment wherein when a performance margin is detected based on a throughput of read commands and/or a power consumption of the data storage device, the fly height of the head is increased to increase the life of the head.

FIG. 2A shows a data storage device in the form of a disk drive according to an embodiment comprising a head 16 actuated over a disk 18, wherein the head comprises a fly height actuator configured to control a fly height of the head over the disk. The disk drive further comprises control circuitry 20 configured to execute the flow diagram of FIG. 2B, wherein a plurality of host read commands are received from a host (block 22). A performance metric associated with accessing the disk to execute the host read commands is measured (block 24). When the performance metric indicates the data storage device is operating with a performance margin (block 26), the fly height actuator is controlled to increase the fly height of the head over the disk (block 28), wherein the performance metric consists of at least one of a throughput of the host read commands and a power consumption of the data storage device.

Figure 1:
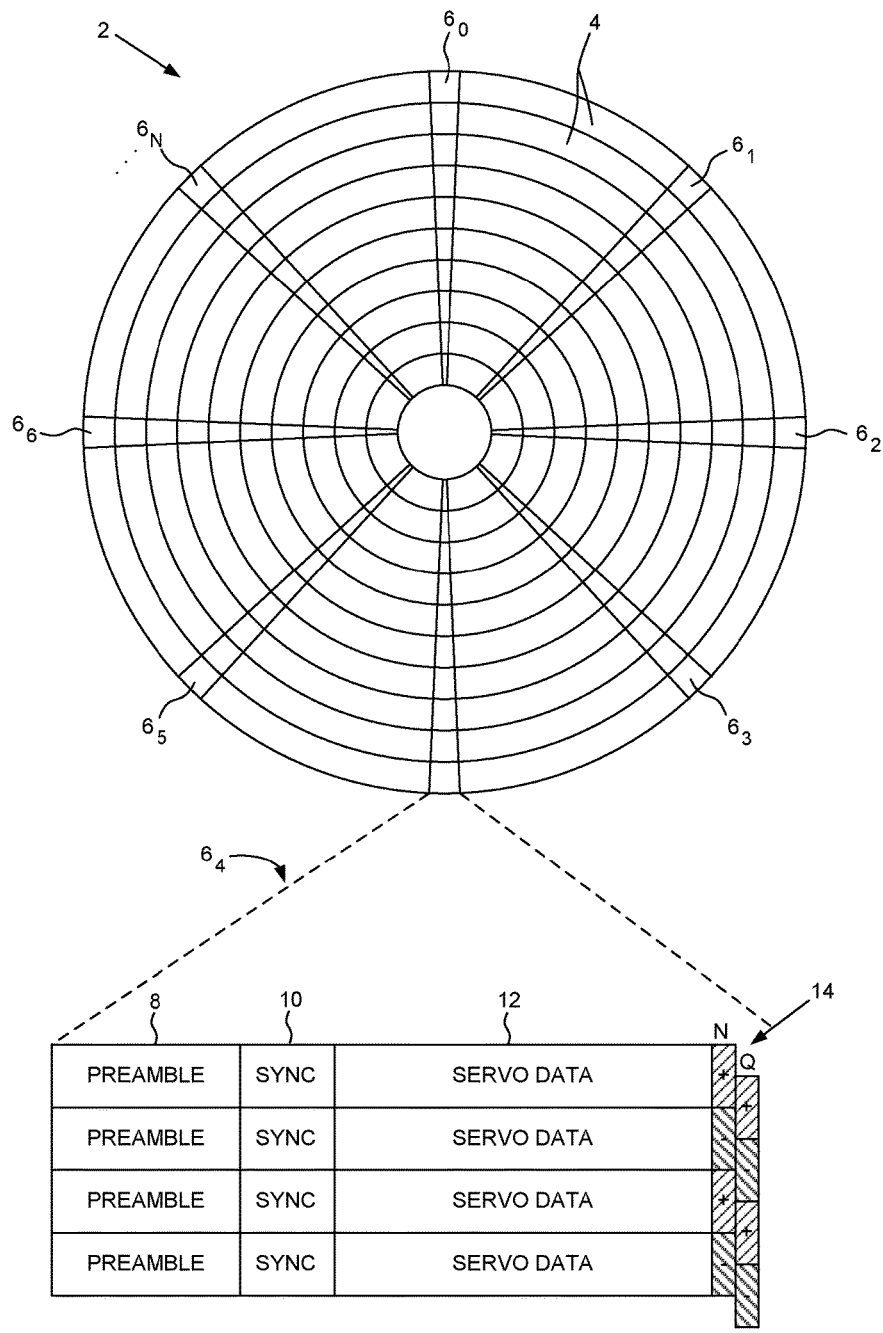
FIG. 1 shows a prior art disk format comprising a plurality of tracks defined by servo sectors.

In the embodiment of FIG. 2A, the disk 18 comprises a plurality of servo sectors $30_0$-$30_N$ that define a plurality of servo tracks 32, wherein data tracks are defined relative to the servo tracks at the same or different radial density. The control circuitry 20 processes a read signal 34 emanating from the head 16 to demodulate the servo sectors and generate a position error signal (PES) representing an error between the actual position of the head and a target position relative to a target track. A servo control system in the control circuitry 20 filters the PES using a suitable compensation filter to generate a control signal 36 applied to a voice coil motor (VCM) 38 which rotates an actuator arm 40 about a pivot in order to actuate the head radially over the disk in a direction that reduces the PES. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Any suitable fly height actuator (FHA) may be integrated into the head 16, such as a piezoelectric actuator which controls the fly height electromechanically, or a suitable heating element which controls the fly height through thermal expansion. The control circuitry 20 generates a suitable FHA control signal 42 (e.g., a current or voltage) which is applied to the FHA in order to adjust the fly height of the head over the disk. In one embodiment, the fly height of the head affects the ability to successfully recover the recorded data during a read operation. Conventionally, the fly height has been controlled to achieve a target fly height, thereby maximizing the likelihood of successfully recovering the data, and thereby maximizing the throughput of the read operations by minimizing the number of retry reads. However, maintaining a target fly height during read operations may decrease the life of the head due to the head/disk interface causing head wear.

In one embodiment, the host may access the disk drive based on a target throughput for host read commands that may be less than a maximum possible throughput. For example, the host may be a server accessing video streams recorded on the disk, wherein the streaming speed of the video data may be less than the maximum throughput of the disk drive. Accordingly, in one embodiment when the host specification for the throughput of the host read commands is less than the maximum possible throughput, the fly height of the head is increased to take advantage of the performance margin. That is, in one embodiment increasing the fly height of the head decreases the throughput of the host read commands, with the benefit of increasing the life of the head. In one embodiment, the fly height of the head is adjusted until a suitable performance metric (e.g., throughput of host read commands) is within a predetermined range.

Figure 3:
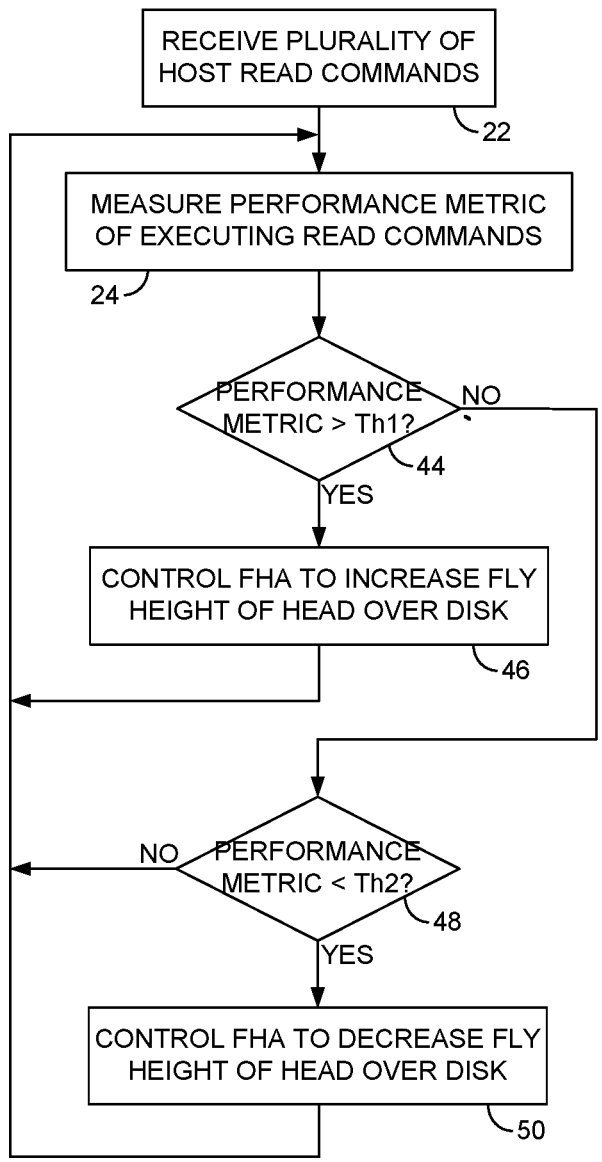
FIG. 3 is a flow diagram according to an embodiment wherein the fly height of the head is increased/decreased to maintain a performance metric within a predetermined range.

An example of this embodiment is shown in the flow diagram of FIG. 3, wherein a performance metric associated with executing host read commands is measured (block 24). When the performance metric exceeds a first threshold (block 44), the FHA control signal is adjusted in order to increase the fly height of the head over the disk (block 46). When the performance metric falls below a second threshold (block 48), the FHA control signal is adjusted in order to decrease the fly height of the head over the disk (block 50). In one embodiment, the first and second thresholds are configured to achieve a desired hysteresis when serving the fly height of the head based on the performance metric.

The performance metric may consist of one or both of a throughput of host read commands and/or a power consumption of the data storage device. Each of these performance metrics can impact the performance of the data storage device as seen from the host, and in one embodiment, predetermined limits may be set for one or both of these performance metrics. For example, a specified limit for the performance metric may be pre-configured into the disk drive, or in another embodiment, the specified limit may be configured by the host. In yet another embodiment, the performance metric may be dynamically reconfigured by the host depending on a mode of operation. For example, if the host transitions between a random access mode and streaming mode, or a plugged mode and a battery mode, the performance metric may be reconfigured to better suit the operating mode. Accordingly, as the performance metric is dynamically configured, an increase in performance margin can be exploited by increasing the fly height of the head so as to increase the longevity of the head.

Figure 4A:
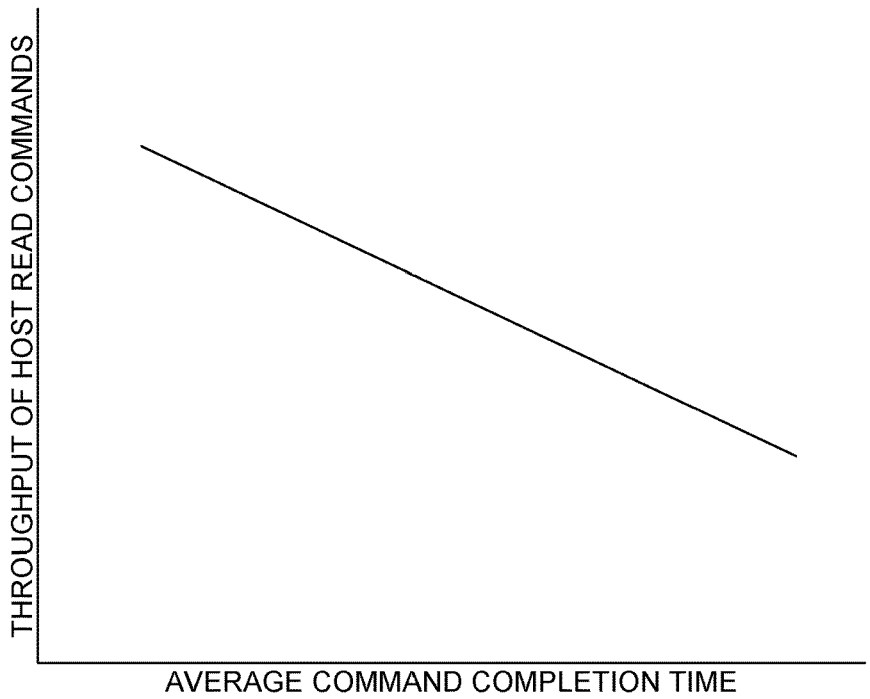
FIG. 4A shows an embodiment wherein the throughput of the read commands is measured based on an average command completion time.
Figure 4B:
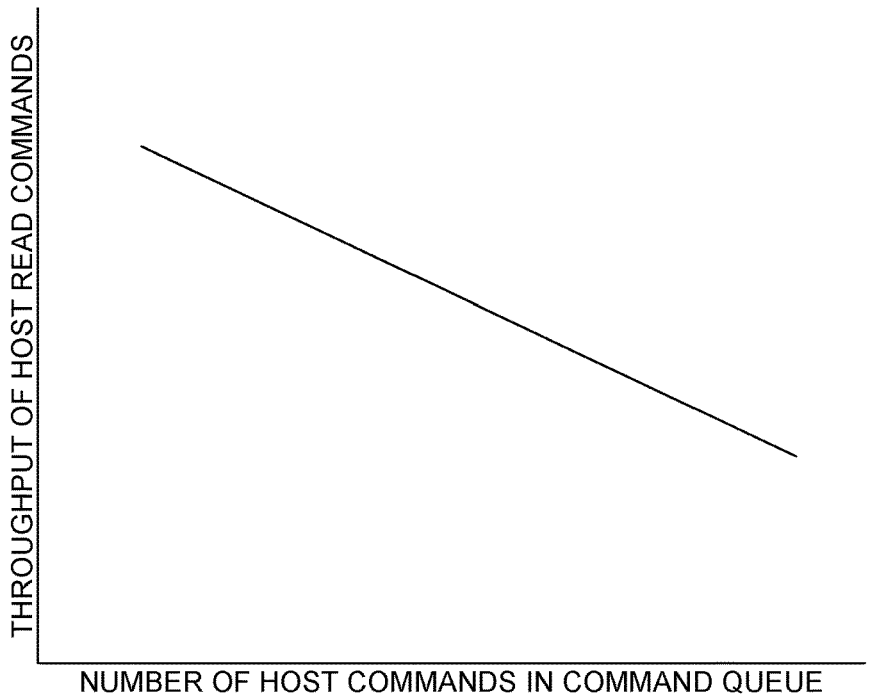
FIG. 4B shows an embodiment wherein the throughput of the read commands is measured based on a number of host commands queued in a command queue.

Any suitable technique may be employed to measure a performance metric based on the throughput of host read commands. In an embodiment shown in FIG. 4A, the throughput of host read commands may be measured based on an average command completion time for the host commands (one or both of write/read commands). The command completion time can be measured, for example, by measuring a difference in time between when a host command is received from the host, and when the command is considered completed as viewed from the host. In one embodiment, as the average command completion time increases, it means the throughput of the host read commands is decreasing. For example, the average command completion time of the host read commands may increase due to an increasing number of iterations of an iterative decoder used to recover the data, or an increasing number of retry reads needed to successfully execute the read commands. If the average command completion time rises above a threshold (meaning the throughput has fallen below a threshold), the fly height of the head may be decreased until the average command completion time is within a target range. In another embodiment shown in FIG. 4B, the throughput of host read commands may be measured based on a number of host commands queued in a command queue. In one embodiment, as the number of host commands in the command queue increases, it means the throughput of the host read commands is decreasing due to a bottleneck condition, such as an increasing number of iterations of an iterative decoder needed to successfully recover the data, or an increasing number of retry reads. In one embodiment, decreasing the fly height of the head alleviates the bottleneck condition, thereby achieving the desired throughput of the host read commands.

Figure 5:
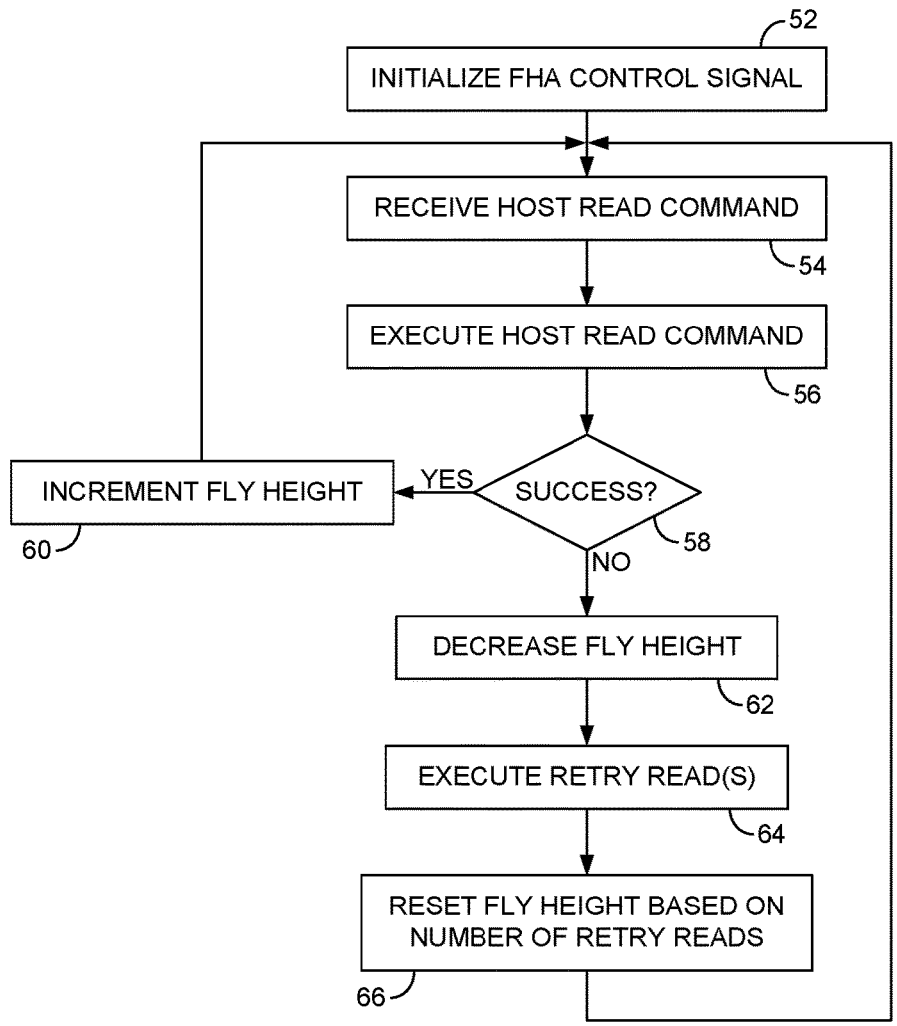
FIG. 5 is a flow diagram according to an embodiment wherein the fly height is incrementally increased after each successful read command not requiring a retry read, and when a retry read is required, the fly height is decreased based on the number of retry reads needed to recover the data.

FIG. 5 is a flow diagram according to an embodiment wherein the FHA control signal is initialized to a predetermined value for use during read operations (block 52), for example, based on a particular mode of operation of either the host and/or the disk drive. When a host read command is received (block 54), an attempt to execute the read command is executed (block 56). If the read command is completed successfully (block 58), the FHA control signal is adjusted to incrementally increase the fly height of the head (block 60). If the initial attempt at executing the read command fails (block 58), the FHA control signal is adjusted to decrease the fly height of the head (block 62) and at least one retry read is executed in an attempt to recover the data (block 64). In one embodiment, decreasing the fly height at block 62 increases the signal-to-noise ratio (SNR) of the read signal, thereby increasing the likelihood of successfully recovering the data during the retry reads. In one embodiment, additional parameters may be adjusted before each retry read, such as introducing a jog value into the servo system so as to adjust the target centerline of the data track, or adjusting coefficients of an equalizer. In the embodiment of FIG. 5 after executing the retry read data recovery procedure, the FHA control signal is adjusted to adjust the fly height of the head based on the number of retry reads needed to recover the data. For example, in one embodiment if decreasing the fly height alone at block 62 results in a successful retry attempt (i.e., a single retry read), it likely means the fly height used during the initial read is too high for the current operating conditions of the disk drive (e.g., current environmental conditions). However, if the data recovery procedure requires multiple retry reads in which other parameters need to be adjusted in addition to decreasing the fly height, it likely means factors other than the fly height caused the initial read to fail. Accordingly, when multiple retry reads are needed to recover from a failed read operation, the fly height may be reset to its previous value at block 66, or adjusted less than if the fly height is considered the primary mitigating factor needed to recover from a failed read operation.

Figure 6:
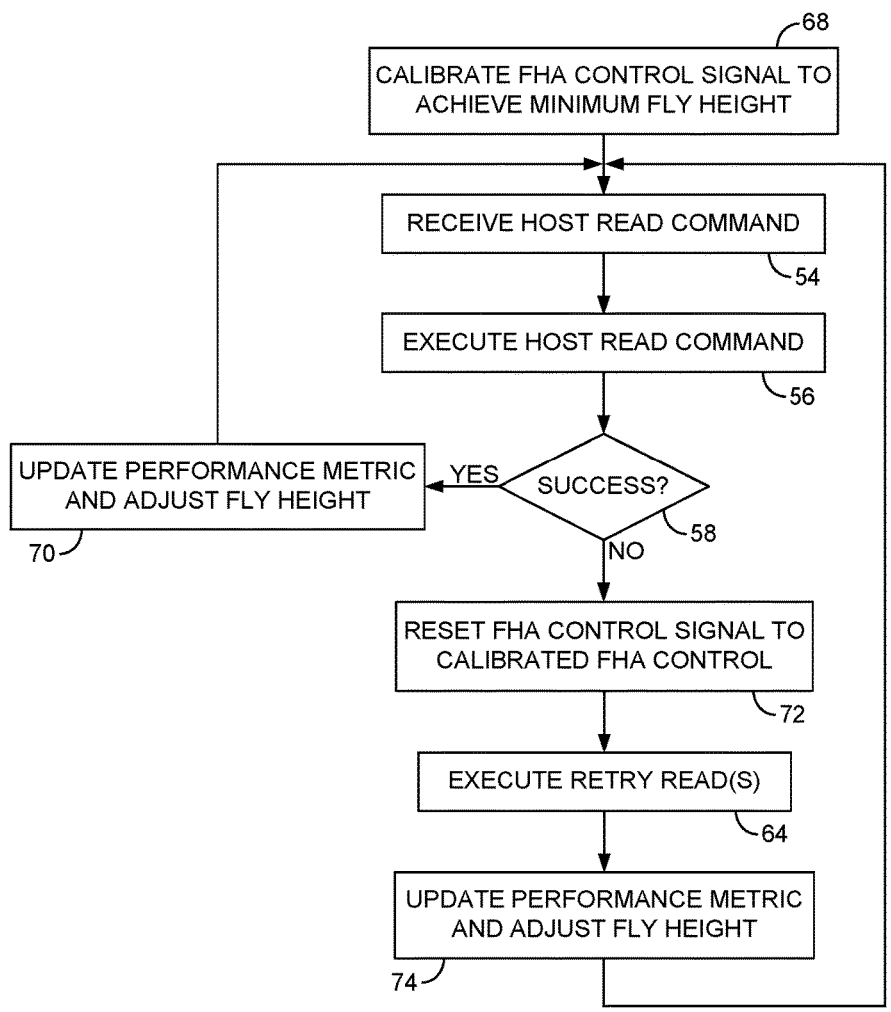
FIG. 6 is a flow diagram according to an embodiment wherein a fly height actuator (FHA) control signal to achieve a minimum fly height is calibrated, and when a read operation fails, the fly height is decreased to the minimal fly height in order to minimize the number of retry reads needed to recover the data.

FIG. 6 is a flow diagram according to an embodiment wherein the control circuitry may execute a calibration procedure in order to calibrate a FHA control signal that will achieve a minimum fly height for the head during read operations (block 68). Any suitable calibration procedure may be employed, wherein in one embodiment the FHA control signal is increased until a touchdown of the head onto the disk surface is detected. The FHA control signal is decremented by a predetermined back-off amount from the touchdown setting to generate the minimum fly height FHA control signal. When an initial read operation succeeds (block 58), the performance metric is updated and the FHA control signal is adjusted to adjust the fly height (block 70). When a read operation fails (block 58), the FHA control signal is reset (block 72) to the calibrated value corresponding to the minimum fly height for read operations (calibrated at block 68). After performing retry reads to recover from the failed read operation (block 64), the performance metric is updated and the FHA control signal is adjusted to adjust the fly height (block 74). In one embodiment, the performance metric may be adjusted based on the number of retry reads needed to recover the data, for example by increasing the average command completion time which results in a decreased fly height to compensate for the decrease in throughput.

In one embodiment, after writing data to the disk the data may degrade over time due, for example, to adjacent track interference while writing adjacent tracks, or due to general magnetic entropy that occurs over time. In one embodiment, the control circuitry may maintain a degradation metric for each track (or segments of a track), for example, by incrementing a counter each time data is written to an adjacent track, or updating a timer to track magnetic entropy. In another embodiment, the control circuitry may maintain a log of suspect track segments due, for example, to defects on the disk surface (e.g., scratches). When the control circuitry is preparing to execute a read operation of a degraded or suspect track segment, in one embodiment the control circuitry may adjust the FHA control signal in order to decrease the fly height of the head during the initial read of a lower quality track segment. This embodiment may avoid the performance degradation of executing retry reads of a degraded or suspect segment, while maintaining the desired higher fly height when reading what are deemed higher quality track segments.

In one embodiment, the performance metric used to adjust the fly height of the head may be a power consumption of the data storage device (in addition to, or instead of, the throughput of the host read commands). Similar to throughput, a host system may be affected by the amount of power consumed by the data storage device, for example, in battery powered applications or server farms where the power costs may be of significant concern. For example, in some applications the benefit of reducing power consumption may outweigh the benefit of faster throughput, and so the data storage device may be configured relative to one or both of these factors. Similar to throughput, the data storage device may at times operate with a performance margin relative to a threshold power consumption, and so the performance margin may be exploited by increasing the fly height of the head during read operations in order to increase the longevity of the head. Similar to throughput, the power consumed by the data storage device may be affected by the number of iterations performed by an iterate decoder and/or a number of retry read operations needed to recover from a failed read operation. Any suitable technique may be used to measure the power consumption of the data storage device, such as by computing the product of the current supplied to the data storage device and the supply voltage.

In one embodiment, the relationship between the performance metric used to adjust the fly height of the head and the actual fly height of the head may vary over time. That is, for a given performance metric the corresponding FHA control signal that achieves the performance metric may vary over time due, for example, to changes in the read element, environmental conditions such as temperature or vibrations, or composition and corresponding fidelity of the storage medium. Accordingly, in one embodiment the FHA control signal is adjusted to achieve a target performance metric (throughput and/or power consumption) rather than to achieve a target fly height, thereby achieving a target performance as seen by the host rather than achieving a target performance as seen by the data storage device (e.g., a target error rate or read signal quality).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, hybrid drives (disk plus solid state), etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk, wherein the head comprises a fly height actuator configured to control a fly height of the head over the disk; and
   control circuitry configured to:
      receive a plurality of host read commands from a host;
      measure a performance metric associated with accessing the disk to execute the host read commands; and
      when the performance metric indicates the data storage device is operating with a performance margin, control the fly height actuator to increase the fly height of the head over the disk,
      wherein the performance metric consists of at least one of a throughput of the host read commands and a power consumption of the data storage device.

2. The data storage device as recited in claim 1, wherein the control circuitry is further configured to increase the fly height of the head until the performance metric is within a predetermined range.

3. The data storage device as recited in claim 2, wherein the control circuitry is further configured to control the fly height actuator to decrease the fly height of the head until the performance metric is within a predetermined range.

4. The data storage device as recited in claim 1, wherein the control circuitry is further configured to:
   incrementally increase the fly height of the head after successfully executing one of the host read commands without needing to execute a retry read; and
   decrease the fly height of the head when one of the host read commands requires at least one retry read to successfully execute the host read command.

5. The data storage device as recited in claim 4, wherein the control circuitry is further configured to decrease the fly height of the head by a decrement that is based on the number of retry reads needed to successfully execute the host read command.

6. The data storage device as recited in claim 5, wherein the decrement increases as the number of retry reads increases.

7. The data storage device as recited in claim 1, wherein the control circuitry is further configured to:
   calibrate a control setting for the fly height actuator that corresponds to a minimum fly height for the head during read operations; and
   when an initial attempt at executing one of the host read commands fails, control the fly height actuator using the control setting that achieves the minimum fly height and execute a retry read for the failed host read command.

8. The data storage device as recited in claim 7, wherein when the initial attempt at executing one of the host read commands fails, the control circuitry is further configured to execute a subsequent one of the host read commands using a lower fly height than the fly height used during the initial attempt of the failed read command.

9. The data storage device as recited in claim 1, wherein the control circuitry is further configured to measure the throughput of the host read commands based on an average command completion time of the read commands.

10. The data storage device as recited in claim 1, wherein the control circuitry is further configured to measure the performance metric by measuring a power consumption of the data storage device over a predetermined number of the host read commands.

11. A method of operating a data storage device, the method comprising:
   receiving a plurality of host read commands from a host;
   measuring a performance metric associated with accessing a disk using a head to execute the host read commands; and
   when the performance metric indicates the data storage device is operating with a performance margin, increasing a fly height of the head over the disk,
   wherein the performance metric consists of at least one of a throughput of the host read commands and a power consumption of the data storage device.

12. The method as recited in claim 11, wherein increasing the fly height of the head comprises increasing the fly height of the head until the performance metric is within a predetermined range.

13. The method as recited in claim 12, further comprising decreasing the fly height of the head until the performance metric is within a predetermined range.

14. The method as recited in claim 11, further comprising:
   incrementally increasing the fly height of the head after successfully executing one of the host read commands without needing to execute a retry read; and
   decreasing the fly height of the head when one of the host read commands requires at least one retry read to successfully execute the host read command.

15. The method as recited in claim 14, further comprising decreasing the fly height of the head by a decrement that is based on the number of retry reads needed to successfully execute the host read command.

16. The method as recited in claim 15, wherein the decrement increases as the number of retry reads increases.

17. The method as recited in claim 11, further comprising:
   calibrating a minimum fly height for the head during read operations; and
   when an initial attempt at executing one of the host read commands fails, setting the fly height of the head to the minimum fly height and executing a retry read for the failed host read command.

18. The method as recited in claim 17, wherein when the initial attempt at executing one of the host read commands fails, further comprising executing a subsequent one of the host read commands using a lower fly height than the fly height used during the initial attempt of the failed read command.

19. The method as recited in claim 11, wherein measuring the performance metric comprises measuring the throughput of the host read commands based on an average command completion time of the read commands.

20. The method as recited in claim 11, measuring the performance metric comprises measuring a power consumption of the data storage device over a predetermined number of the host read commands.

* * * * *